(12) United States Patent
    Hartschuh et al.

(10) Patent No.:     US 10,604,956 B1
(45) Date of Patent:     Mar. 31, 2020

(54) MODULAR TIRE SERVICE STATION

(71) Applicant: The Goodyear Tire & Rubber Company, Akron, OH (US)

(72) Inventors: Ryan Douglas Hartschuh, Wadsworth, OH (US); Justin Marcus Beck, Akron, OH (US)

(73) Assignee: The Goodyear Tire & Rubber Company, Akron, OH (US)

( * ) Notice:    Subject to any disclaimer, the term of this patent is extended or adjusted under 35 U.S.C. 154(b) by 0 days.

(21) Appl. No.: 16/704,006

(22) Filed:    Dec. 5, 2019

Related U.S. Application Data

(63) Continuation-in-part of application No. 16/125,817, filed on Sep. 10, 2018.

(51) Int. Cl.
    *E04H 5/06* (2006.01)
    *B60C 25/05* (2006.01)
    *B60S 5/00* (2006.01)
    *G06Q 10/00* (2012.01)

(52) U.S. Cl.
    CPC .......... *E04H 5/06* (2013.01); *B60C 25/0512* (2013.01); *B60S 5/00* (2013.01); *G06Q 10/20* (2013.01)

(58) Field of Classification Search
    CPC ......... E04H 5/06; B60S 5/00; B60C 25/0512; G06Q 10/20
    USPC ....................................................... 52/79.1
    See application file for complete search history.

(56) References Cited

U.S. PATENT DOCUMENTS

| | | | |
|---|---|---|---|
| 2,765,938 A | 10/1956 | Addezio | |
| 3,308,845 A | 3/1967 | Bellas et al. | |
| 3,942,575 A | 3/1976 | Blomgren, Sr. et al. | |
| 4,724,875 A | 2/1988 | Baldwin et al. | |
| 4,784,445 A | 11/1988 | Ott | |
| 4,981,318 A | 1/1991 | Doane et al. | |
| 5,452,607 A | 9/1995 | Axtell | |
| 5,603,148 A | 2/1997 | Hjorth-Hansen | |
| 5,833,294 A | 11/1998 | Williams et al. | |
| 6,131,454 A | 10/2000 | Kopp et al. | |
| 6,135,501 A | 10/2000 | Rinehart | |
| 6,651,392 B2 | 11/2003 | Ritzal | |
| 6,691,573 B2 | 2/2004 | Silvagi et al. | |
| 6,773,132 B2 | 8/2004 | Gilligan et al. | |
| 6,886,811 B2 | 5/2005 | Springett et al. | |
| 7,302,963 B2 | 12/2007 | Dagn | |
| 7,954,366 B2 | 6/2011 | Gushman et al. | |
| 8,013,571 B2 * | 9/2011 | Agassi ................ | B60L 50/66 320/109 |
| 8,176,931 B1 | 5/2012 | Cajiga et al. | |
| 8,943,999 B2 | 2/2015 | Giarrizzo, Jr. | |
| 8,955,897 B1 | 2/2015 | Miller et al. | |
| D736,406 S | 8/2015 | Andrade-Roper | |

(Continued)

OTHER PUBLICATIONS

Nate Berg, Does Anyone Own the Rights to Shipping Container Designs, Aug. 11, 2011, Atlantic CityLab.

*Primary Examiner* — Jeanette E Chapman
(74) *Attorney, Agent, or Firm* — Edward T. Kennedy

(57) ABSTRACT

A modular tire service station for servicing vehicle tires includes a first pre-configured service module and a second pre-configured service module that is proximate the first module. A customer area is disposed in at least one of the first module and the second module, a tire storage area is disposed in at least one of the first module and the second module, and a tire service area is disposed in at least one of the first module and the second module.

20 Claims, 12 Drawing Sheets

(56) References Cited

U.S. PATENT DOCUMENTS

| | | | |
|---|---|---|---|
| 9,139,091 B1* | 9/2015 | Penilla | H04W 4/44 |
| 9,288,948 B2 | 3/2016 | McNamara et al. | |
| 9,457,703 B2 | 10/2016 | Moore | |
| 9,499,129 B1* | 11/2016 | Penilla | B60L 53/68 |
| 9,499,378 B2 | 11/2016 | Kelly et al. | |
| D776,574 S | 1/2017 | Griffin et al. | |
| 10,255,570 B1* | 4/2019 | Brandmaier | H04W 4/90 |
| 2005/0257358 A1 | 11/2005 | Giarrizzo, Jr. | |
| 2007/0016483 A1* | 1/2007 | Chenn | G06Q 30/06 |
| | | | 705/26.1 |
| 2007/0193318 A1* | 8/2007 | Churchill | E05B 11/00 |
| | | | 70/389 |
| 2009/0045258 A1* | 2/2009 | Sabeta | G06Q 30/02 |
| | | | 235/385 |
| 2009/0058355 A1* | 3/2009 | Meyer | B60L 53/305 |
| | | | 320/104 |
| 2009/0089385 A1* | 4/2009 | Du | H04L 51/063 |
| | | | 709/206 |
| 2009/0101446 A1 | 4/2009 | Franchi | |
| 2009/0297306 A1 | 12/2009 | Cook | |
| 2010/0214597 A1* | 8/2010 | Hasseler | B41J 29/38 |
| | | | 358/1.15 |
| 2011/0012384 A1 | 1/2011 | Stewart | |
| 2012/0119876 A1* | 5/2012 | Shah | F16P 3/08 |
| | | | 340/5.53 |
| 2014/0222191 A1* | 8/2014 | Blumenau | B65G 1/137 |
| | | | 700/218 |
| 2015/0075271 A1 | 3/2015 | Tracy et al. | |
| 2015/0354277 A1 | 12/2015 | Hokanson et al. | |
| 2017/0339350 A1* | 11/2017 | Ustun | B60P 3/00 |
| 2019/0023236 A1* | 1/2019 | Webb | H02J 7/35 |
| 2019/0213539 A1* | 7/2019 | Petroski | G06Q 10/0836 |
| 2019/0213540 A1* | 7/2019 | Petroski | G06Q 10/0836 |
| 2019/0287080 A1* | 9/2019 | Penilla | G06Q 30/08 |

* cited by examiner

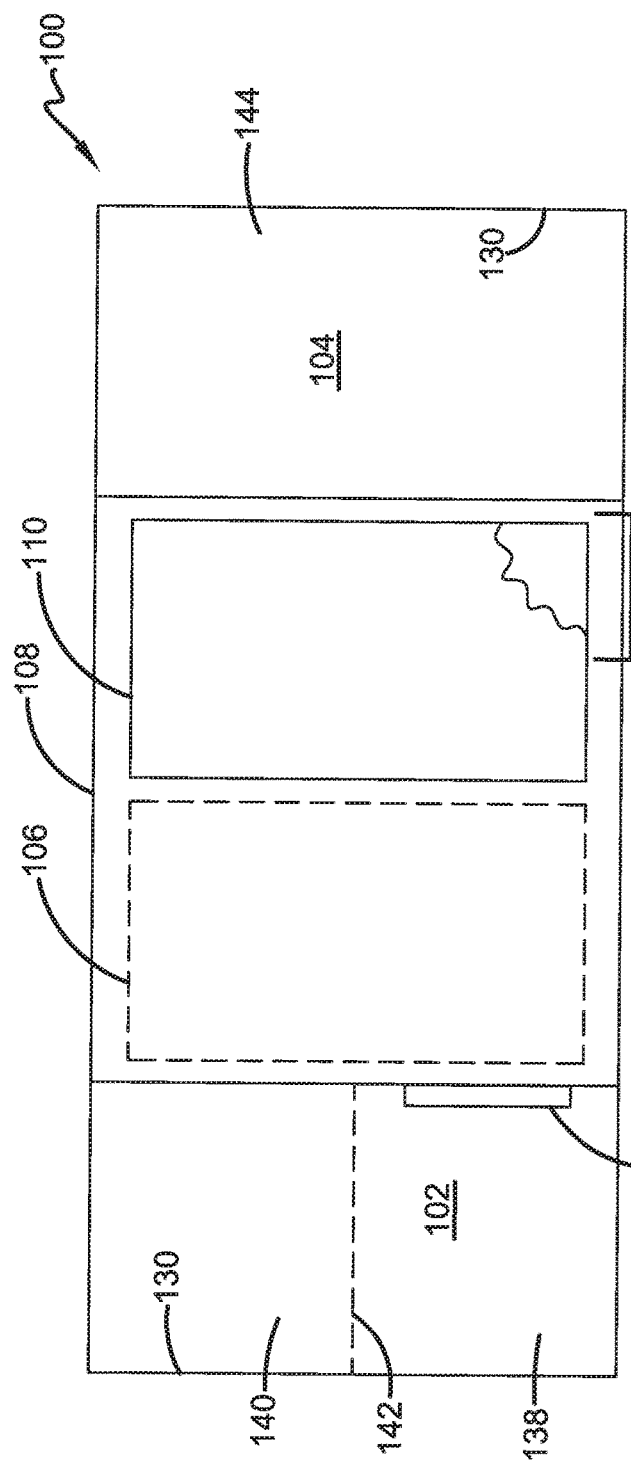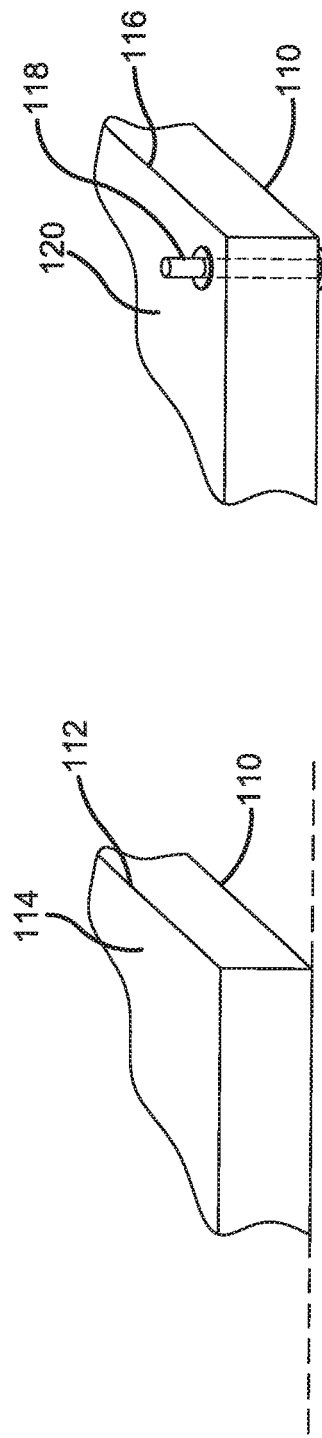

MODULAR TIRE SERVICE STATION

FIELD OF THE INVENTION

The invention relates to the servicing and sale of vehicle tires. More particularly, the invention is directed to a service station that enables tire servicing and potential sale in pre-equipped, easily transportable modules with customizable configurations.

BACKGROUND OF THE INVENTION

Conventional pneumatic tires are designed to perform for relatively long periods of time. Nevertheless, such tires are each formed with a ground-engaging tread that necessarily wears down over the life of the tire. When the tread wears down to a certain level, replacement of the tire is recommended.

In addition, pneumatic tires are subject to air pressure losses due to puncture by nails and other sharp objects, temperature changes, and/or diffusion of air through the tire itself. Such air pressure losses may lead to a need to repair or replace the tire.

Traditionally, tire repair and replacement, known as tire servicing, has been performed at a commercial garage, service center or other permanent brick-and-mortar establishment. Tire servicing at this type of permanent establishment has been necessary due to the heavy-duty equipment that is needed to jack up the vehicle to remove the tire and the wheel or rim on which the tire is mounted, to extract the tire from the wheel, install a new or repaired tire on the wheel, balance the new or repaired tire and wheel, inflate the new or repaired tire, and install the new or repaired tire and wheel on the vehicle. In addition, a significant amount of storage space has been needed to maintain an inventory of tires of different types and sizes.

A disadvantage of permanent establishments is the significant time and expense associated with purchasing or leasing land and then building a permanent building on the land. Because of such time and expense, there are many geographic areas where commercial garages or service centers are not present, which is an inconvenience to users needing tire servicing.

In an attempt to address this issue, prior art service trucks were developed. These trucks were heavy-duty vehicles that included some equipment used for tire servicing and which were capable of traveling to different locations. However, being vehicles, such trucks could not always remain in a specific location for an extended period of time and had limited space for equipment and tire storage. In addition, as vehicles, such trucks often had high operating costs due to fuel consumption and maintenance.

As a result, there is a need in the art for a station that enables tire servicing and optional tire sales with an easy-to-maintain, re-locatable structure which requires minimal infrastructure investment.

SUMMARY OF THE INVENTION

According to an aspect of an exemplary embodiment of the invention, a modular tire service station for servicing vehicle tires includes a first pre-configured service module and a second pre-configured service module that is proximate the first module. A customer area is disposed in at least one of the first module and the second module, a tire storage area is disposed in at least one of the first module and the second module, and a tire service area is disposed in at least one of the first module and the second module.

According to another aspect of an exemplary embodiment of the invention, a method of servicing vehicles using a modular service station includes providing a web site that enables a customer to select the modular service station as a location for vehicle servicing, and to schedule a date for the servicing. The customer is enabled to enter into the web site at least one of an electronic mail address and a phone number at which the customer can be contacted. A designated area is provided for the customer to park the vehicle to be serviced on the scheduled servicing date, and a key exchange box is installed near the modular service station, the key box being formed with a plurality of secure compartments for receiving vehicle keys. The customer is enabled to insert the keys for the vehicle to be serviced into a first selected one of the secure compartments and lock the first selected one of the secure compartments. The compartments of the key exchange box are unlocked and opened to retrieve the vehicle keys, The vehicle is moved to a selected area in the modular service station and is serviced in the modular service station. Upon completion of the servicing, the vehicle is moved to a designated area for pickup by the customer. A second selected one of the secure compartments in the key exchange box is opened and the vehicle keys are inserted. The second selected one of the secure compartments in the key exchange box is locked, and the customer is alerted that the vehicle servicing is complete. The alert includes a number corresponding to the second selected one of the secure compartments in the key exchange box and a combination for a lock that secures the second selected one of the secure compartments, which enables the customer to obtain the vehicle keys.

BRIEF DESCRIPTION OF THE DRAWINGS

The invention will be described by way of example and with reference to the accompanying drawings, in which:

FIG. 8 is a schematic plan view of a lower portion of the modular service station shown in FIG. 7;

FIG. 9A is an enlarged perspective view of a portion of a first example of a leveling pad shown in FIGS. 7 and 8;

FIG. 9B is an enlarged perspective view of a portion of a second example of a leveling pad shown in FIGS. 7 and 8;

Similar numerals refer to similar parts throughout the drawings.

DETAILED DESCRIPTION OF THE INVENTION

Figure 1:
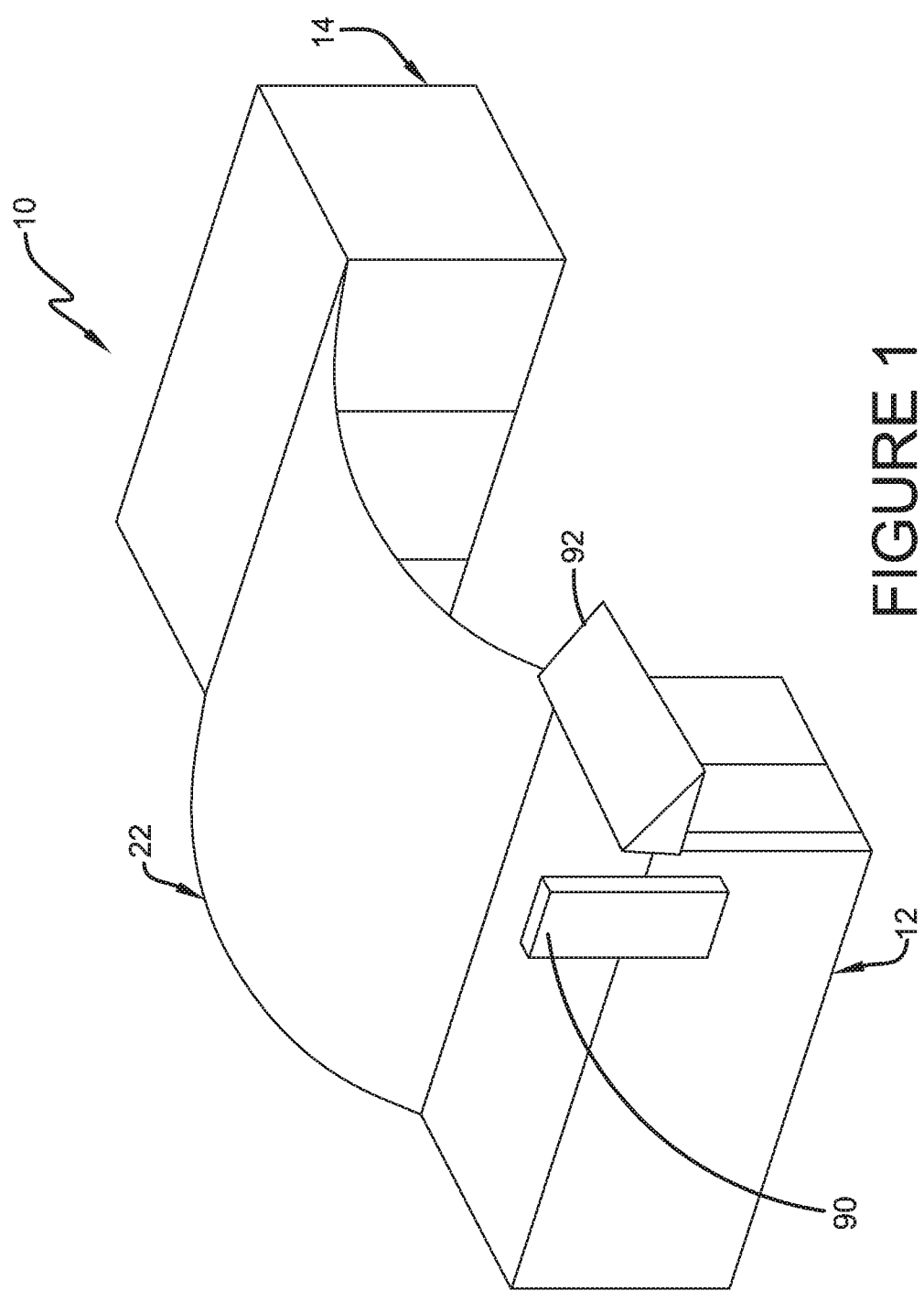
FIG. 1 is a schematic perspective view of a first exemplary embodiment of a modular tire service station of the present invention.

Turning to FIG. 1, a first exemplary embodiment of modular tire service station of the present invention is indicated generally at 10. The modular service station 10 enables automobile tire servicing for customers with minimal infrastructure investment, and may function as a point of sale and an installation location, as will be described below.

The modular service station 10 includes at least two pre-built and pre-configured service modules 12 and 14 that contain all equipment needed for tire servicing. For example, the modules 12 and 14 preferably are pre-fabricated rigid containers, such as shipping containers. When shipping containers are used, each module 12 and 14 may be about eight feet wide by about twenty feet long. Of course, other dimensions for each module 12 and 14 may be employed based upon particular design considerations, such as about ten feet wide by about seventeen feet long. Such dimensions enable each module 12 and 14 to be configured with all equipment at a central location, and then transported by a heavy-duty vehicle, such as a semi-truck with a flat-bed, tilt-bed or other trailer, to a service site. In addition, when the modular service station 10 is desired to be re-located it can be picked up and transported by a heavy-duty vehicle to a new location.

Figure 2:
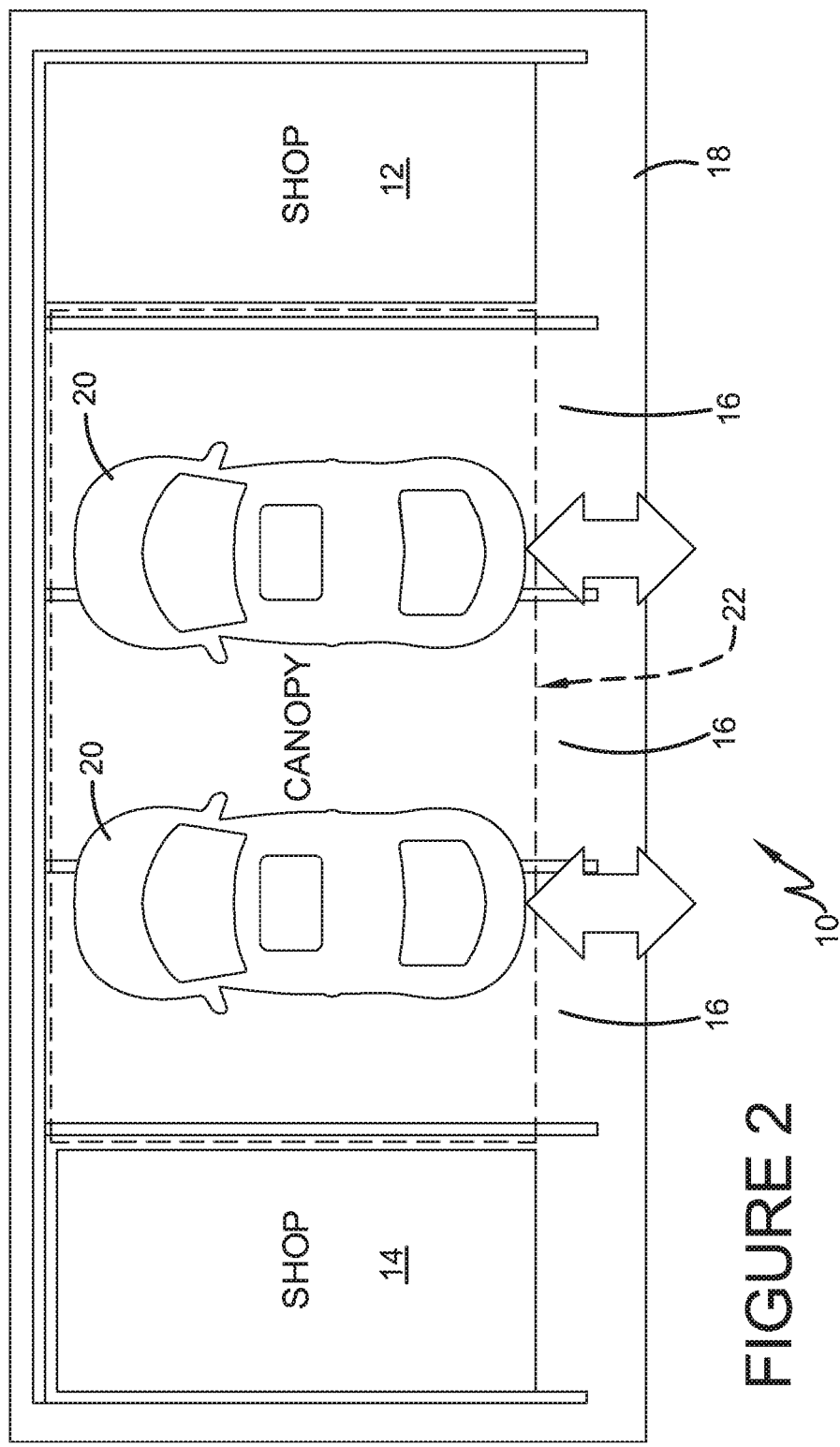
FIG. 2 is a schematic plan view of the modular service station shown in FIG. 1, with vehicles in the service station area.

With additional reference to FIG. 2, the modular service station 10 is configured to fit within a limited number of parking spaces 16 in a parking lot 18, such as about five to ten parking spaces. Such a configuration enables the modular service station 10 to be disposed in a large parking lot 18 as the service site for convenience, as will be described in greater detail below. Preferably, the two modules 12 and 14 are proximate one another, and may be spaced apart in a parallel manner with two or more parking spaces 16 between them, which enables one or more vehicles 20 to park between the modules for servicing.

Preferably, the modular service station 10 includes an awning or canopy 22 that is attached to and extends between the modules 12 and 14 over the parking spaces 16 to shelter the vehicles 20 from sun, rain and snow. The size of the canopy 22 depends on the number of parking spaces 16 to be available between the modules 12 and 14. For example, when about two parking spaces 16 are available, the canopy 22 is from about fourteen feet wide by about eighteen to about twenty feet long. When about three or four parking spaces 16 are available between the modules 12 and 14, the canopy is from about twenty-seven feet wide by about eighteen to about twenty feet long. In this manner, the canopy 22 is formed with approximately the same length as each module 12 and 14 and a width as desired based upon the parking spaces 16 to be used for servicing the vehicles 20.

Each module 12 and 14 includes a rectangular configuration of external walls 30 and may be configured according to specific design considerations. For example, referring now to FIG. 3, a first module 12 may include a customer area 24 and a tire storage area 26. Preferably, a door 28 is included in one of the external walls 30 of the module 12 to enable customers 42 to enter the customer area 24. The customer area 24 preferably further includes a customer interface area 32 and a customer waiting area 34.

Figure 3:
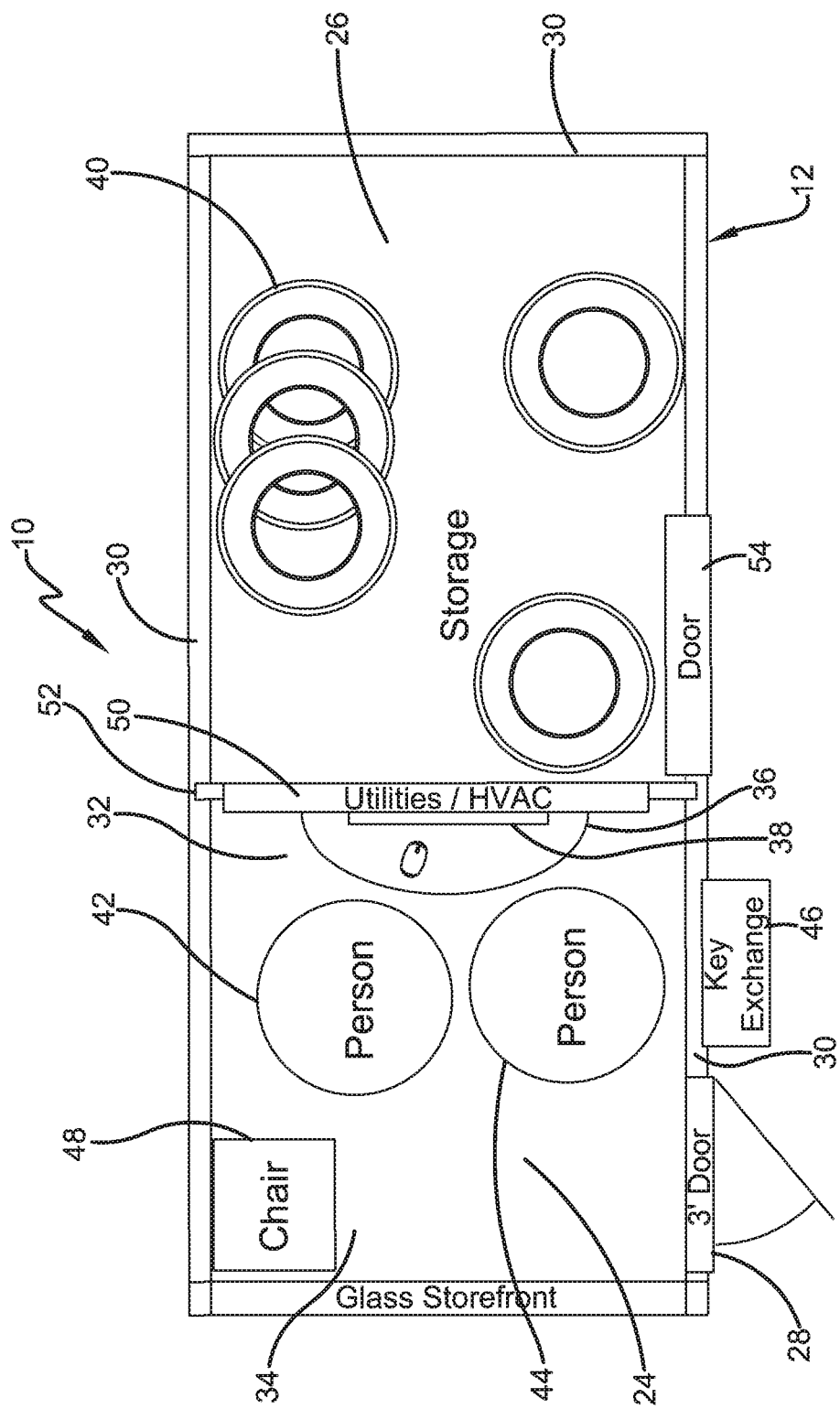
FIG. 3 is a schematic plan view of an example of a configuration of a first module of the modular service station shown in FIG. 1.
Figure 5:
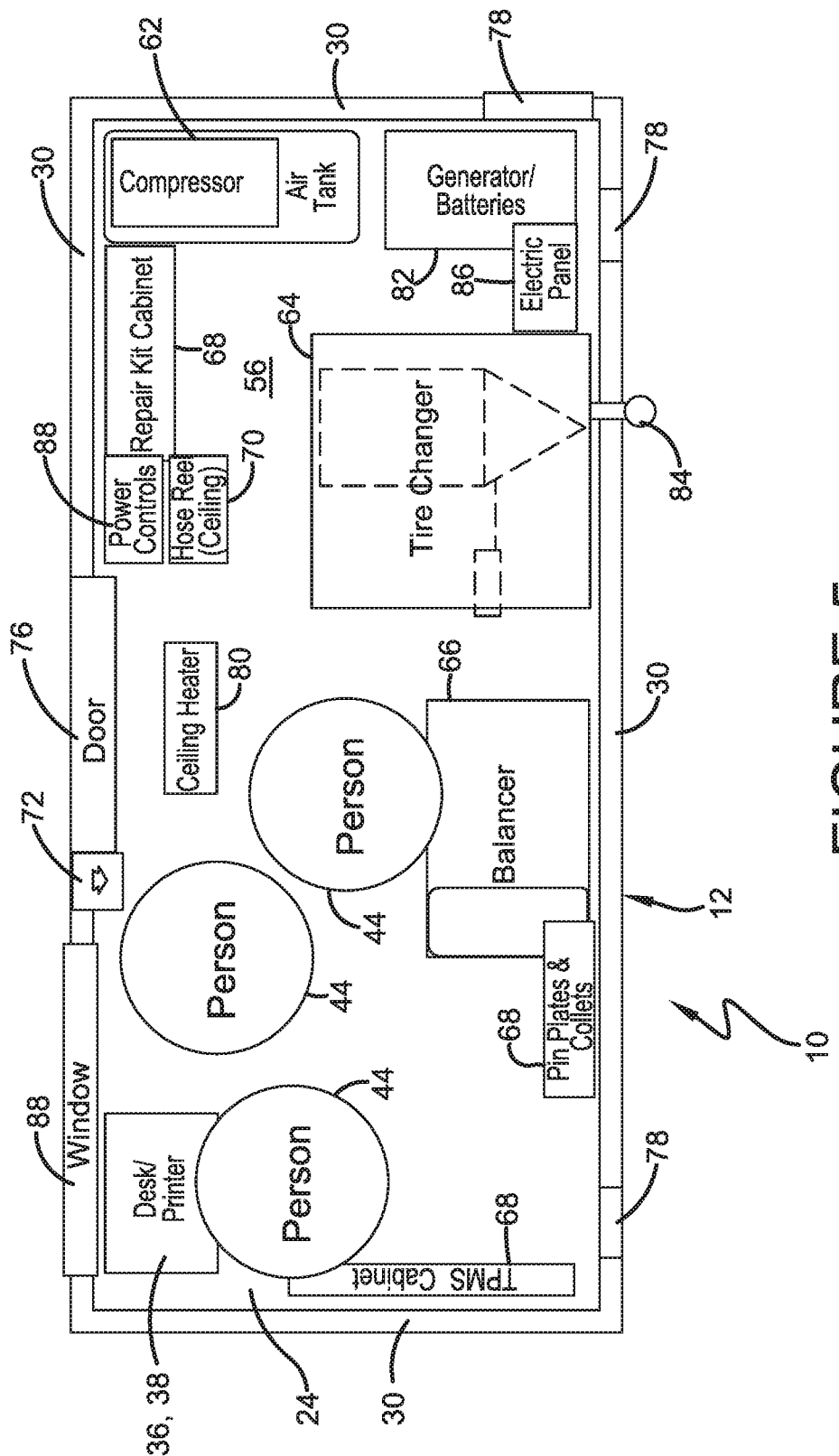
FIG. 5 is a schematic plan view of an alternative configuration of the first module of the modular service station shown in FIG. 1.

The customer interface area 32 serves as a point of information or sale for the customer 42. The customer interface area 32 may be a minimal area, as shown in FIG. 5 and described below, or a relatively large area as shown in FIG. 3 and described now. More particularly, the customer interface area is equipped with a desk or a cabinet and counter 36 to support a computer, monitor and printer configuration 38. Preferably, the computer 38 is connected to a wireless network to enable customers 42 to check in or out of the modular service station 10, as well as to confirm and/or place orders. For example, a customer 42 may order new tires 40 in advance through an online or phone system and schedule a service appointment to occur at the modular service station 10 through the online or phone system. When the customer arrives 42 at the modular service station 10 for tire servicing, the customer may confirm the order and check in using the computer 38, with or without the assistance of a technician 44. Alternatively, the customer 42 may visit the modular service station 10 to order new tires 40 and schedule a service appointment using the computer 38 with or without the assistance of the technician 44.

The customer area 24 optionally includes a key exchange box 46, which enables the customer 42 to leave his or her car keys at the modular service station 10 for use by the technician 44 as needed for tire servicing. The key exchange box 46 also enables the customer 42 to pick up his or her keys upon returning to the modular service station 10 if the technician 44 is unavailable.

As mentioned above, the customer area 24 preferably includes a customer waiting area 34. The modular service station 10 is configured to be located in a parking lot 18, such as the parking lot of a shopping center, which enables the customer 42 to walk to the nearby stores and shop and/or run errands during tire servicing. However, if the customer 42 elects to remain at the modular service station 10 during tire servicing, the customer waiting area 34 optionally includes furniture, such as a chair 48. In order to provide comfort for the customer 42, the customer area 24 preferably also includes a conditioned environment, such as a heating, ventilation and air conditioning (HVAC) unit 50 and easy-to-clean flooring.

The customer area 24 is preferably separated from the storage area 26 by an internal wall 52, which enables the new tires 40 to be stored in the storage area without intruding upon the relative comfort of the customer area. A wide door 54 is included in one of the external walls 30 of the module 12 to enable new tires 40 to be moved in and out of the storage area 26. Because the new tires 40 preferably are ordered in advance and delivered to the modular service station 10, the storage area 26 only needs to include enough space to store a few dozen tires for upcoming service appointments, rather than hundreds or thousands of tires. For example, the storage area may be about eight feet by about ten feet, which is about eighty square feet total, as opposed to the hundreds or thousands of square feet required in the prior art. The storage area 26 includes a durable floor and may optionally be outfitted with racks to store tires 40.

Figure 4:
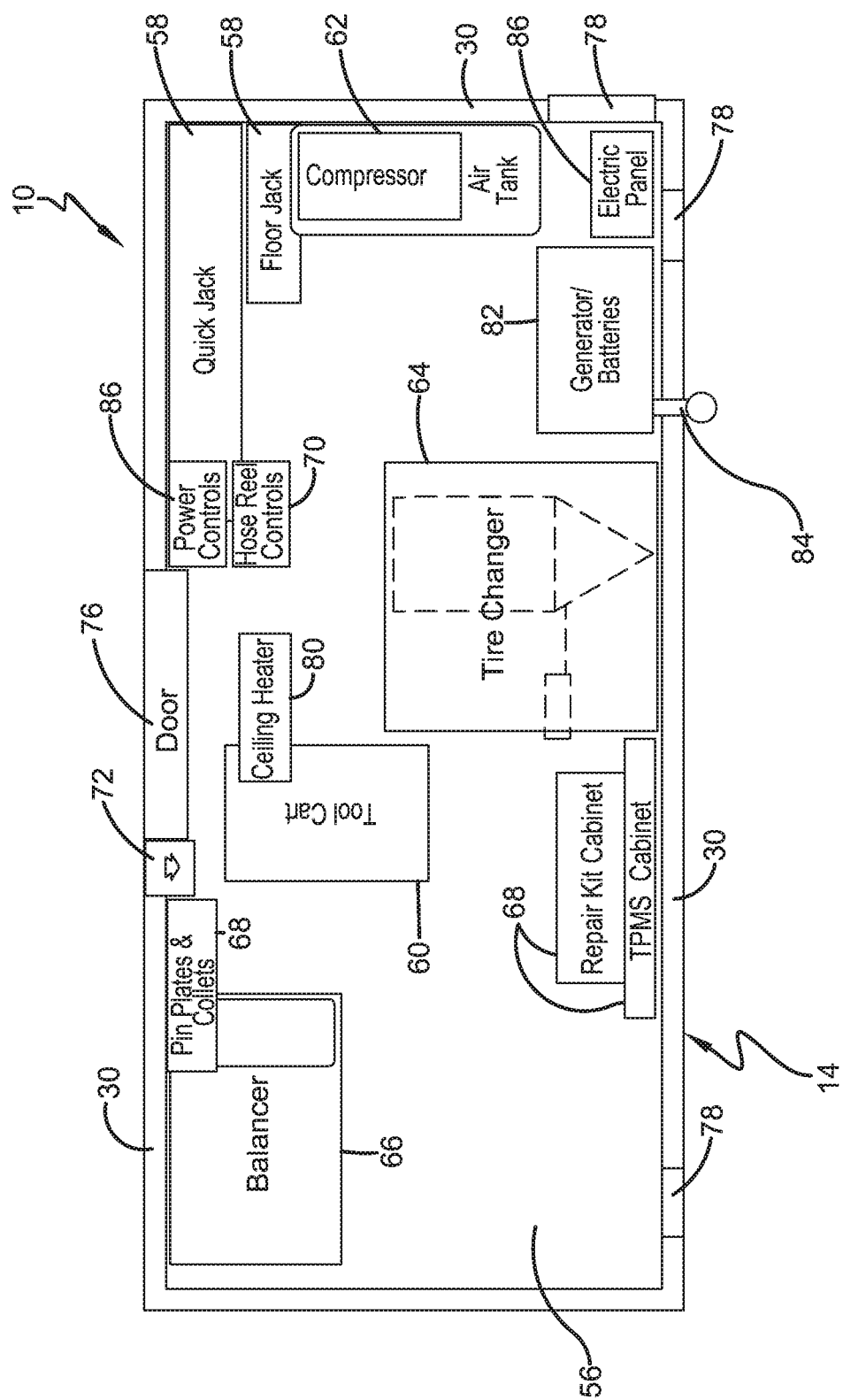
FIG. 4 is a schematic plan view of an example of a configuration of a second module of the modular service station shown in FIG. 1.

Turning now to FIG. 4, a second module 14 preferably includes a tire service area 56. The service area 56 includes equipment needed to perform tire servicing. For example, the equipment preferably includes one or more jacks 58 to jack up the vehicle 20 (FIG. 2) in order to remove the old tire and the wheel on which the old tire is mounted. A tool cart 60 is provided to store hand-held tools such as an impact wrench for the removal of the wheel from the wheel studs, as known to those skilled in the art. An air compressor and air tank unit 62 supplies compressed air to any hand-held tools that are pneumatically powered. Once the old tire and rim are removed from the vehicle 20, a tire changer 64 is used to extract the old tire from the wheel and to install the new tire 40 (FIG. 3) onto the wheel. The air compressor and air tank unit 62 supplies compressed air for inflation of the new tire 40. The new tire 40 is balanced on the wheel using a balancer 66 before being installed on the vehicle 20.

One or more cabinets 68 are provided to store parts for balancing, replacement of parts for a tire pressure monitoring system (TPMS), and/or other parts that may be needed for tire replacement or repair. A hose reel 70 is included to enable easy use and storage of pneumatic air lines that extend between the air compressor and tank unit 62, the tire changer 64 and any pneumatic hand-held tools. For safety, at least one fire extinguisher 72 is mounted to one of the external walls 30 of the second module 14. A wide door 76 is included in one of the external walls 30 of the module 14 to enable the technician 44 (FIG. 3) to bring the jacks 58, old tires, new tires 40, wheels and other items in and out of the service area 56 as needed. The second module 14 includes one or more exhaust vents or louvres 78 formed in one or more of the external walls 30 for ventilation, and an optional heater 80 to provide a conditioned environment and thus comfort for the technician 44. The second module 14 may also include lighting, such as ceiling-mounted LED lights, and insulation to reduce the sound heard outside of the service area 56 generated by the above-described equipment.

Preferably, the air compressor and tank 62, the tire changer 64 and the balancer 66 are mounted to or otherwise secured to the walls 30 and/or the floor of the second module 14. Other equipment, such as the jacks 58 and the tool cart 60, may be on casters for portability between the service area 56 and the vehicle 20 in the parking spaces 16.

The second module 14 preferably also includes the power system for the modular service station 10. More particularly, the modular service station 10 is a self-contained unit, and includes its own power generating means. Preferably, the power generating means are located in the second module 14 with the service area 56, and any power that is needed by the first module 12 is provided through electrical lines extending between the first and second modules.

The power generating means preferably includes a generator and battery unit 82. The generator and battery unit 82 includes a generator that generates electricity and batteries that store the generated electricity for use by any of the above-described electrical devices or equipment in the first and second modules 12 and 14. Solar panels may be employed in place of, or in combination with, the generator and battery unit 82. Of course, other combinations for the power generating means may be employed, such as a generator without a battery and solar panels with a battery, based on particular design considerations. An exhaust vent 84 is formed in one of the external walls 30 of the second module 14 to enable the generator and battery unit 82 to vent exhaust as needed. An electrical panel 86 is attached to one of the external walls 30 of the second module 14 to divide the power feed from the generator and battery unit 82 into circuits with circuit breakers for the connection of the above-described electrical devices or equipment. A control panel 88 that is electrically connected to the electrical panel 86 may be provided to enable central control of the above-described electrical devices or equipment.

The power generating means for the modular service station 10 preferably includes a 120-volt system capable of producing about 70 amps to about 80 amps, or about 8,400 watts to about 9,600 watts. The following table provides an example of particular power requirements of the modular service station 10.

| Equipment | Maximum Amps | Volts | Watts |
|---|---|---|---|
| Compressor | 14 | 120 | 1680 |
| Tire changer | 6.2 | 120 | 750 |
| Balancer | 0.8 | 120 | 100 |
| Radiant heaters | 15 | 120 | 1800 |
| Exhaust fan(s) | 2 | 120 | 240 |
| Lights (LED) | 3 | 120 | 360 |
| Lift | 15 | 120 | 1800 |
| Customer HVAC (tbd) | 14 | 120 | 1680 |
| Two 20 amp circuits (miscellaneous receptacle needs) | 40 | 120 | 4800 |
| Total | 110 | | 13210 |

Of course, the power requirements for the power generating means, such as the generator and battery unit 82, may vary based upon particular configurations of the equipment employed in the modular service station 10.

In this manner, the modular service station 10 enables a customer 42 to order new tires 40 and schedule an appointment for tire servicing. The new tires 40 are delivered to the tire storage area 26. The customer 42 parks his or her vehicle 20 in one of the parking spaces 16 under the canopy 22, checks in at the customer area 24, and may walk to a nearby store or wait at the customer area for the tire servicing to be performed. The new tires 40 are moved from the storage area 26 to the service area 56. Equipment such as a jack 58 is brought out to the vehicle 20 to remove the old tires and wheels. The old tires and wheels are brought into the service area 56, where each old tire is removed from its respective wheel and the new tire 40 is installed on the wheel and balanced, using equipment such as the tire changer 64 and the balancer 66. The new tires 40 on the wheels are brought out and installed on the vehicle 20 under the canopy 22, and the vehicle is ready for customer pickup.

In the modular service station 10, there may be other specific combinations or arrangements of the customer area 24, the storage area 26 and the service area 56 in the each of the first and second modules 12 and 14 than the above-described arrangement.

For example, the first module 12 may include an alternative arrangement as shown in FIG. 5. In this arrangement, the first module 12 may include the customer area 24 and the service area 26. More particularly, the customer area 24 may include a window 88 formed in one of the external walls 30, as well as the desk 36 with the computer 38. The customer 42 (FIG. 3) speaks to one of the technicians 44 through the window 88, and the technician uses the computer 38 for customer check-in and processing. The service area 26 includes the rigidly-mounted service equipment, such as the air compressor and tank 62, the tire changer 64 and the balancer 66, as well as the cabinets 68 and the hose reel 70. The service area 26 also includes the service roll-up door 76, fire extinguisher 72, exhaust vents or louvres 78, heater 80, as well as the power system, including the generator and battery unit 82, the exhaust vent 84, the electrical panel 86 and the control panel 88.

Figure 6:
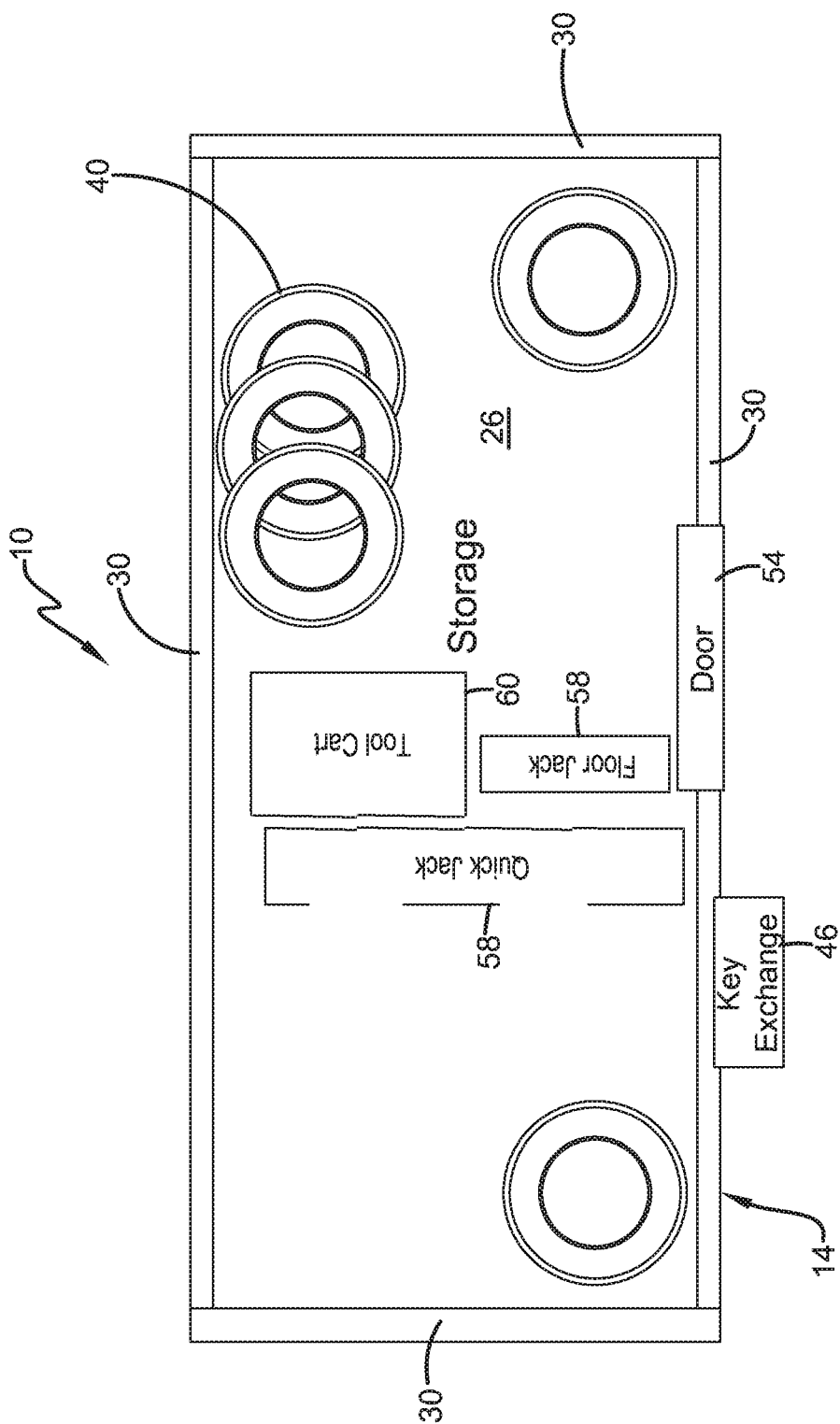
FIG. 6 is a schematic plan view of an alternative configuration of the second module of the modular service station shown in FIG. 1.

Also in this arrangement, as shown in FIG. 6, the second module 14 may include the storage area 26 and portable equipment. More particularly, the new tires 40 are stored in the storage area 26 in the second module 14, and the storage roll-up door 54 is included in one of the external walls 30 to enable the tires to be moved in and out of the second module. The portable servicing equipment, such as the jacks 58 and the tool cart 60, are stored in the storage area 26 when they are not in use in the parking spaces 16 (FIG. 2). The key exchange box 46 may also be attached to one of the walls 30 of the second module 14.

The appearance of the modular service station 10 is flexible, as the exterior design of the modules 12 and 14, as well as the canopy 22, may be adapted to match surrounding buildings. For example, the exterior of the modules 12 and 14 may be painted to match buildings adjacent the parking lot 18 and/or may be covered with a fascia, such as brick fascia to match brick buildings. Exterior signs 90 and awnings 92 (FIG. 1) may optionally be attached to one or both of the modules 12 and 14, based upon particular design considerations.

The modular service station 10 is quiet and clean to operate, as the generator 82, compressor 62 and other equipment preferably are reduced-noise models. In addition, such equipment may be located within a module 12 or 14 with sound-insulated walls 30. Moreover, certain tools, such as hand-operated tools, may be battery operated to reduce the noise generated in the tire servicing operation. The modular and compact configuration of the service station 10 enables easy cleaning of the modules 12 and 14 and the parking spaces 16.

Because of the modular configuration of the modular service station 10, the service station can be sized or scaled appropriately for the expected volume of business. For example, in a busy area, one module 12 may be used for the customer area 24 and the storage area 26, while multiple modules 14 may be used for multiple service areas 56. Likewise, multiple modules 12 or 14 may be used for multiple storage areas 26. In addition, a larger canopy 22 may be used to enable more parking spaces 16 to be employed, for servicing of a larger number of vehicles 20. Thus, three or more modules 12 and 14 may be employed without affecting the overall concept or operation of the invention. In addition, while the modules 12 and 14 have been described above as preferably being spaced apart in parallel fashion, they may be arranged in alternative configurations, such as an L-shaped configuration, to suit particular design and space considerations without affecting the overall concept or operation of the invention.

Figure 7:
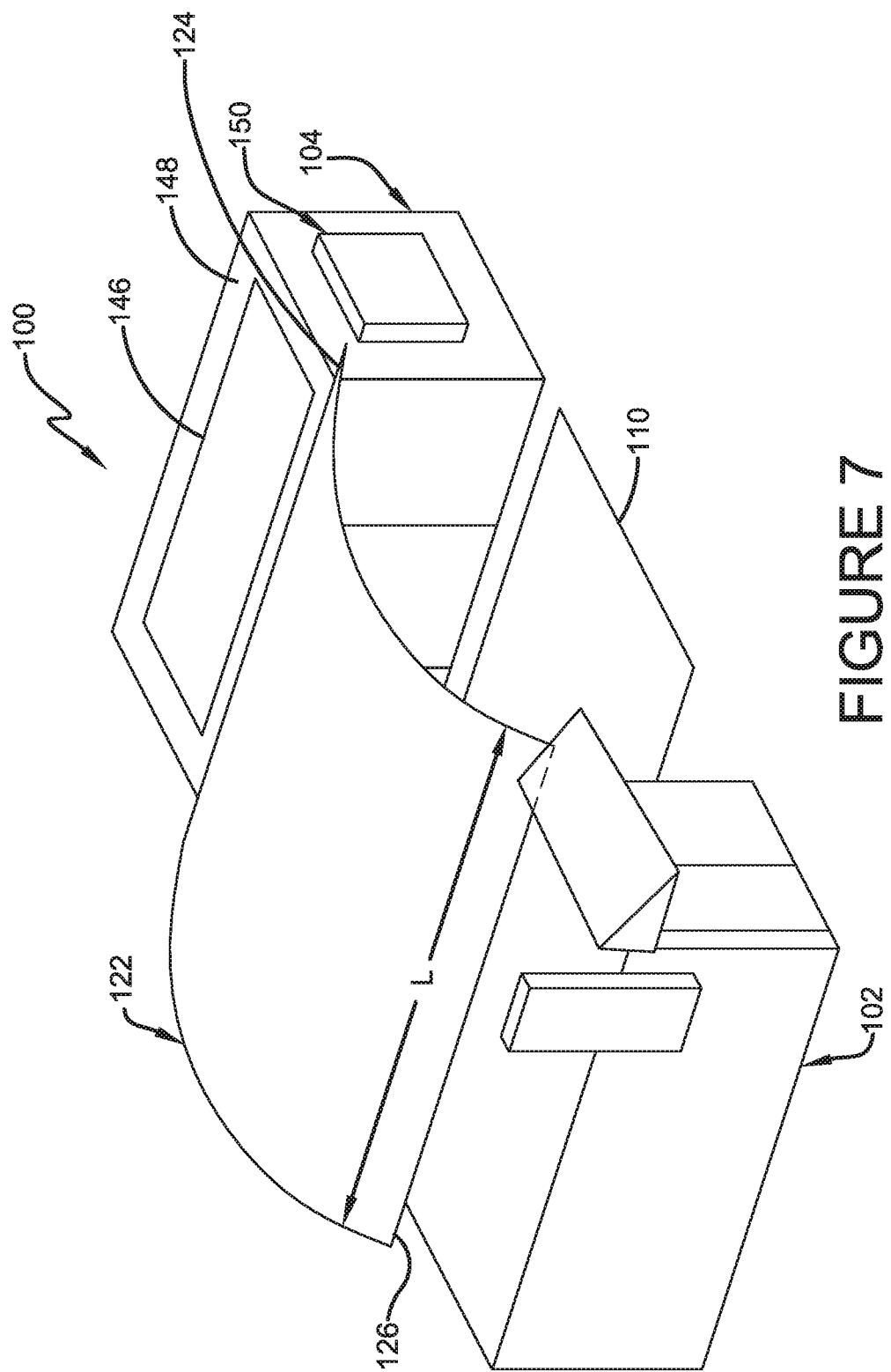
FIG. 7 is a schematic perspective view of a second exemplary embodiment of a modular tire service station of the present invention.

Turning to FIG. 7, a second exemplary embodiment of modular tire service station of the present invention is indicated generally at 100. The second embodiment of the modular service station 100 is similar in structure and operation to the first embodiment of the modular service station 10 (FIG. 1). Therefore, the description below shall focus on the principal differences between the second embodiment of the modular service station 100 and the first embodiment of the modular service station 10. As with the first embodiment of the modular service station 10, the second embodiment of the modular service station 100 enables the servicing of automobiles for customers with minimal infrastructure investment, and may function as a point of sale and an installation location.

The modular service station 100 includes at least two pre-built and pre-configured service modules 102 and 104 that contain all equipment needed for tire servicing and additional vehicle services, such as vehicle alignment. For example, the modules 102 and 104 preferably are pre-fabricated rigid containers, such as shipping containers. When shipping containers are used, each module 102 and 104 may be about eight feet wide by about eighteen feet long. Of course, other dimensions for each module 102 and 104 may be employed based upon particular design considerations. Such dimensions enable each module 102 and 104 to be configured with all equipment at a central location, and then transported by a heavy-duty vehicle, such as a semi-truck with a flat-bed, tilt-bed or other trailer, to a service site and relocated as desired.

With additional reference to FIG. 8, the modular service station 100 is configured to fit within a limited number of parking spaces 106 in a parking lot 108, such as about four to ten parking spaces. Preferably, the two modules 102 and 104 are proximate one another, and may be spaced apart in a parallel manner with two or more parking spaces 106 between them, which enables one or more vehicles 20 (FIG. 2) to park between the modules for servicing.

The second embodiment of the modular service station 100 includes structural features that enable vehicle alignment to be performed. More particularly, alignment of the vehicle 20 must be performed on a level surface. Because the parking lot 108 typically is not a sufficiently level surface, a pad 110 is formed in a selected one of the parking spaces 106. The pad 110 is formed as a level surface, and may be a concrete pad 112 that is poured with a level upper surface 114 as shown in FIG. 9A. Alternatively, as shown in FIG. 9B, when the concrete pad 112 is not desirable, a metal plate 116 may be employed for the pad 110, which includes leveling jacks 118 that enable an upper surface 120 of the plate to be maintained in a level manner. In order for the vehicle 20 to park and be contained on the pad 110, the pad is preferably at least about six (6) feet wide by about ten (10) feet long, and may be up to about eight (8) feet wide by about twenty (20) feet long. Optionally, more than one of the parking spaces 106 may be formed with the pad 110 to enable multiple vehicles 20 to be aligned at the same time.

Preferably, the modular service station 100 includes an awning or canopy 122 that is attached to and extends between the modules 102 and 104 over the parking spaces 106 to shelter the vehicles 20 from sun, rain and snow. As a result, the width of the canopy 122 depends on the number of parking spaces 106 that are to be available between the modules 102 and 104. Preferably, the canopy 122 includes a front overhang 124 and a rear overhang 126 to provide additional shelter over the vehicles 20. For example, when the modules 102 and 104 are each about eighteen feet long, the canopy 122 may include a length L of about twenty feet, which includes a one-foot overhang for each of the front overhang 124 and the read overhang 126. In this manner, the canopy 122 is formed with a longer length L than each module 102 and 104 and a width as desired based upon the number of parking spaces 106 to be used for servicing the vehicles 20.

Figure 10:
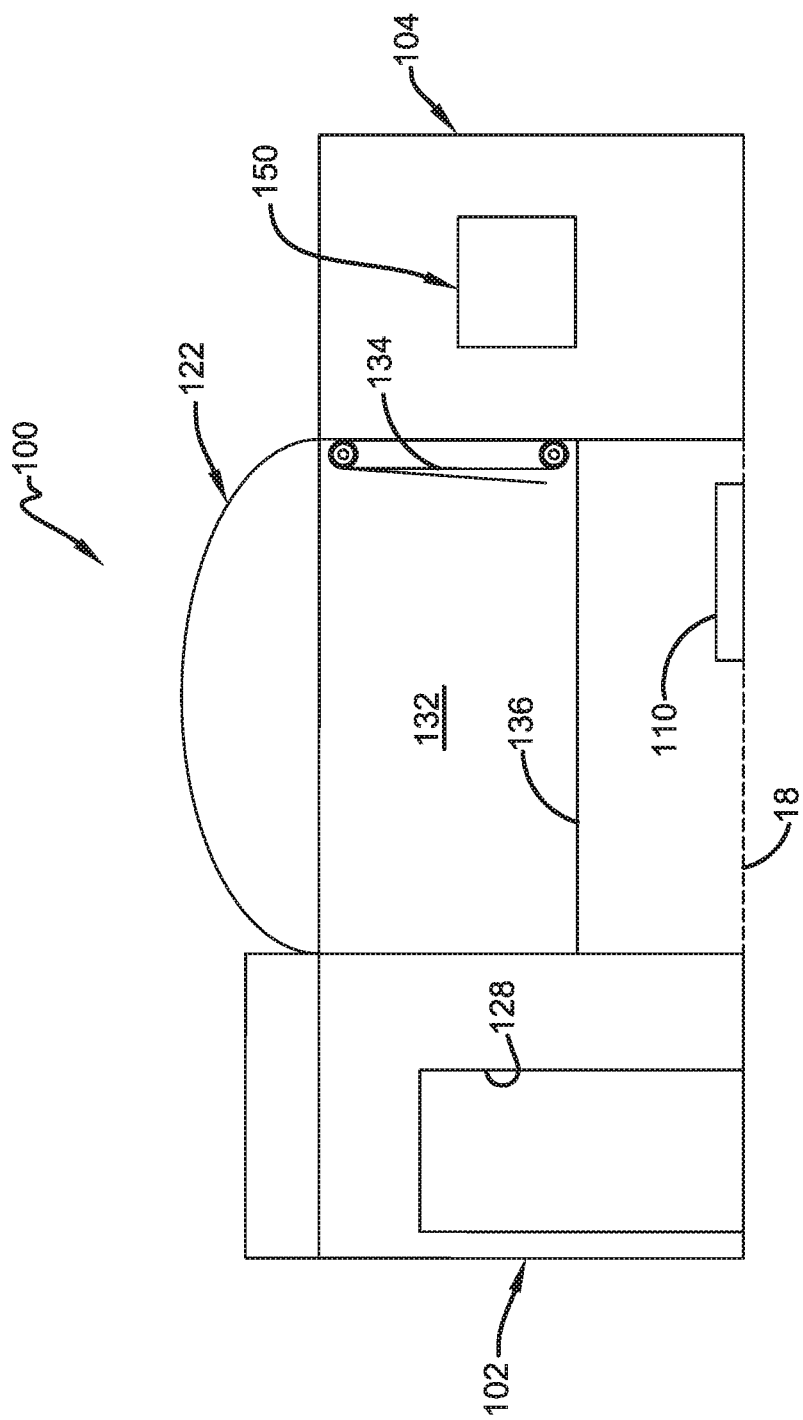
FIG. 10 is a schematic front view of the modular service station shown in FIG. 7.

With reference to FIG. 10, the canopy 122 preferably includes an adjustable rear wall 132 for additional protection of the parking spaces 106 from sun, rain, snow and wind. Preferably, the rear wall 132 includes a pulley system 134 to enable a bottom edge 136 of the rear wall to be raised or lowered as desired, depending on weather conditions.

Returning to FIG. 8, each module 102 and 104 includes a rectangular configuration of external walls 130, which may be configured according to specific design considerations. Preferably, the first module 102 includes a customer area 138 and a tire storage area 140 that are separated from one another by an internal wall 142.

The customer area 138 may be equipped with an interactive device 164, such as a touch screen device or a computer 38 (FIG. 3), which enables a customer 42 (FIG. 3) to access a web site. Preferably, the interactive device 164 is connected to a wireless network to enable customers 42 to check in or out of the modular service station 100, as well as to confirm and/or place orders. For example, a customer 42 may order new tires 40 (FIG. 3) in advance through an online or phone system and schedule a service appointment to occur at the modular service station 100 through the online or phone system. When the customer arrives 42 at the modular service station 100 for tire servicing, the customer may confirm the order and check in using the interactive device 164. Alternatively, the customer 42 may visit the modular service station 100 to order new tires 40 and schedule a service appointment using the interactive device 164.

The second module 104 preferably includes a service area 144, with equipment as described above for the first embodiment of the modular service station 100. Additional equipment that is known in the art may be included in the service area 144 for performing alignment of the vehicles 20.

As with the first embodiment of the modular service station 10, the second embodiment of the modular service station 100 includes power generating means. The power generating means may include a generator and battery unit 82 (FIG. 4) as described above, and/or solar panels 146 as shown in FIG. 7. Preferably, the solar panels 146 are disposed on a roof 148 of one or both of the first module 102 and the second module 104. The solar panels 146 may be employed in place of, or in combination with, the generator and battery unit 82. The power requirements for the second embodiment of the modular service station 100 may be different from those described above for the first embodiment of the modular service station 10, and are likely greater, due to the additional service capability of vehicle alignment.

Figure 11:
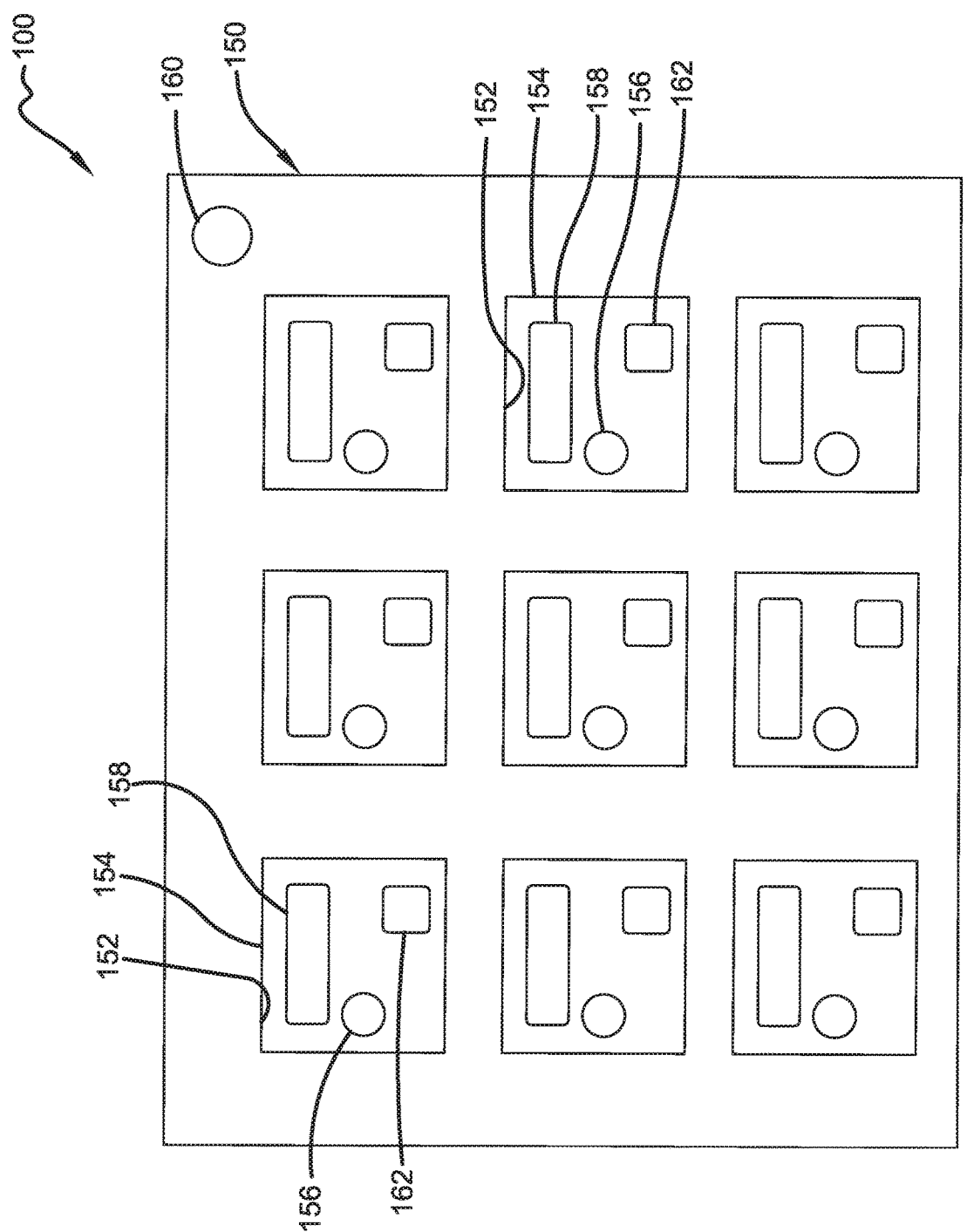
FIG. 11 is an enlarged schematic front view of an exemplary key exchange box shown in FIG. 7.

Turning now to FIGS. 7 and 11, the second embodiment of the modular service station 100 preferably includes a key exchange box 150. The key exchange box 150 may be affixed to an external wall 130 (FIG. 8) of the first module 102 or the second module 104, or may be remote and separate from the first and second modules. For example, the key exchange box 150 may be affixed to a wall of a building or other structure that is nearby the first module 102 and/or the second module 104. The key exchange box 150 is a structural feature that enables drop off and pick up of keys for multiple vehicles 20 in a secure manner without the need for a customer 42 to wait for a technician 44, or for a technician to wait for a customer.

More particularly, the key exchange box 150 includes multiple compartments 152 for keys. Each compartment 152 includes a door 154 and an access knob 156 which are controlled by a combination lock 158. The combination lock 158 may be set to a combination that is unique to the respective knob 156 and door 154 of a specific compartment 152 to enable only that compartment to be opened. A master lock 160 enables a technician 44 to open the doors 154 to all of the compartments 152 to obtain all of the keys in the key exchange box 150. Each compartment also includes a number 162 for easy identification of each respective compartment 152. Preferably, each door 154, each combination lock 158 and the master lock 160 are manual and do not require electricity, thereby enabling the key exchange box 150 to be operated without the use of electrical power.

Because of the modular configuration of the modular service station 100, the service station can be sized or scaled appropriately for the expected volume of business. For example, in a busy area, one module 102 may be used for the customer area 138 and the storage area 140, while multiple modules 104 may be used for multiple service areas 144. Likewise, multiple modules 102 or 104 may be used for multiple storage areas 140. In addition, three or more modules 102 and 104 may be employed without affecting the overall concept or operation of the invention. In addition, while the modules 102 and 104 have been described above as preferably being spaced apart in parallel fashion, they may be arranged in alternative configurations, such as an L-shaped configuration, to suit particular design and space considerations without affecting the overall concept or operation of the invention.

In this manner, the modular service station 10, 100 enables tire servicing and sales in pre-equipped, easily transportable modules 12, 14, 102 and 104, which can be located in an existing parking lot 18, 108. The modular service station 10, 100 thus provides a station that enables tire servicing with a customizable and easy-to-maintain structure which requires minimal infrastructure investment.

The present invention also includes a method of servicing vehicles using a modular service station 10, 100. The method includes steps in accordance with the description that is presented above and shown in FIGS. 1 through 13.

Figure 12:
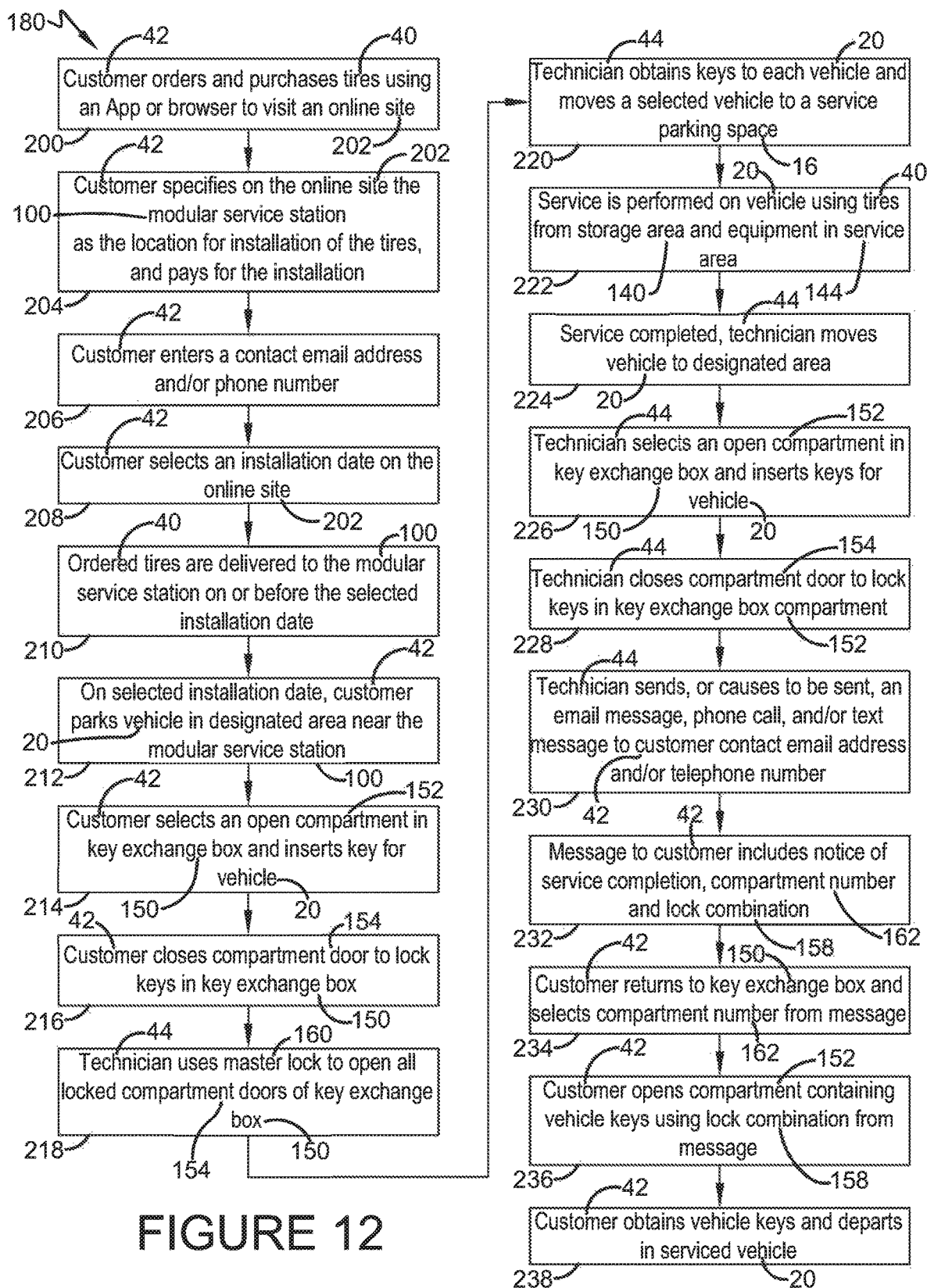
FIG. 12 is flow diagram showing steps of an exemplary method of servicing a vehicle using a modular service station.
Figure 13:
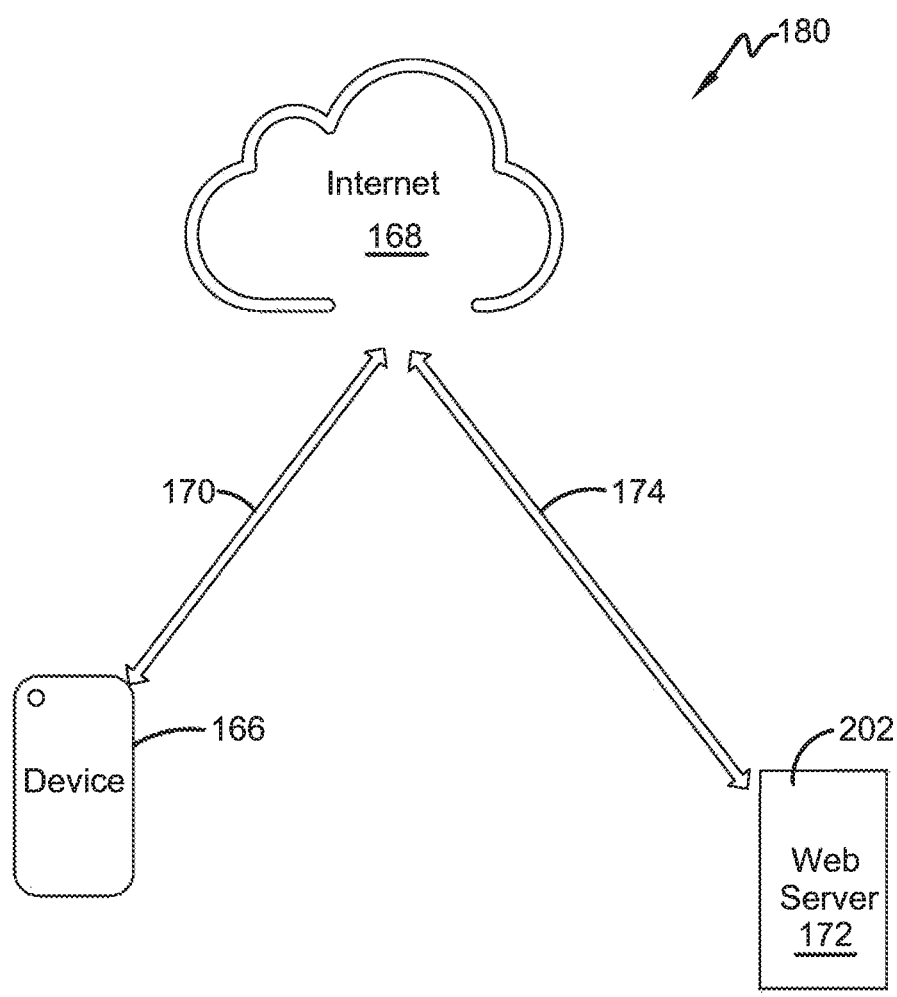
FIG. 13 is a schematic representation of a computing structure that may be employed in the modular service station shown in FIG. 7 and the method of servicing a vehicle shown in FIG. 12.

With reference to FIG. 12, steps of an exemplary method of servicing vehicles 180 using a modular service station 100 are shown. In step 200, the customer 42 orders and/or purchases tires 40 using a software application, known as an App, or using an Internet web browser, to visit an online site 202, also known as a web site. As shown in FIG. 13, to execute step 200, a computing device 166 is connected to the Internet 168 through a wired or wireless connection 170. A web server 172 is also connected to the Internet 168 through a wired or wireless connection 174, and stores the web site 202. The computing device 166 thus connects to and communicates with the web server 172 and the web site 202 using the Internet 168 through connections 170 and 174. The web site 202 contains information about tires 40, including descriptive information and purchasing information, and allows the customer 42 to order and/or purchase tires using the device 166. Exemplary computing devices 166 include a desktop computer, a laptop computer and a portable device, such as a cellular phone and/or a tablet computer.

The customer 42 may thus visit the online site 202 at a location that is remote from the modular service station 100, such as from home or work using a computer or cellular phone as the computing device 166. Alternatively, the customer 42 may visit the online site 202 while in the customer area 138 of the modular service station 100 using the interactive device 164 as the computing device 166.

Returning to FIG. 12, once the tires 40 have been ordered and/or purchased, the customer 42 specifies on the web site 202, using the App or the web browser, the modular service station 100 as the location for installation of the tires and pays for the installation, step 204. While on the online site 202, the customer 42 enters an email address and/or telephone number at which he or she can be contacted, step 206. The customer 42 selects an installation date on the web site 202, step 208.

The tires 40 that have been purchased by the customer 42 are delivered to the modular service station 100 on or before the selected installation date, step 210, and preferably are stored in the storage area 140.

On the selected installation date, the customer 42 parks the vehicle 20 on which the tires 40 are to be installed in a designated area near the modular service station, step 212. The customer 42 goes to the key exchange box 150 and selects an open one of the compartments 152 and puts the keys for the vehicle 20 in the selected compartment, step 214. Once the keys are placed in the compartment 152, the customer 42 closes the door 154, which locks shut to secure the keys inside the selected compartment, step 216. The customer 42 may then leave the site of the modular service station 100.

When it is time to service the vehicle 20, the technician 44 uses the master lock 160 to open all of the locked compartment doors 154, step 218. The technician 44 obtains the keys to each vehicle 20 and moves a selected vehicle to a selected one of the parking spaces 116, step 220. The service is performed on the vehicle 20, using the tires 40 from the storage area 140 and equipment in the service area 144, step 222. When the service is complete, the technician 44 moves the vehicle 20 to a designated area, which preferably is the same area where the customer 42 dropped the vehicle off, step 224. The technician 44 goes to the key exchange box 150 and selects an open one of the compartments 152 and puts the keys for the vehicle 20 in the selected compartment, step 226. Once the keys are placed in the compartment 152, the technician 44 closes the door 154, which locks shut to secure the keys inside the selected compartment, step 228. The technician 44 sends, or causes to be sent, an email to the contact email address that was previously entered by the customer 42, and/or a text message or phone call to the contact phone number that was entered by the customer, step 230.

The email, text message and/or phone call includes an alert that servicing of the vehicle 20 is complete, the number 162 of the compartment 152 that contains the keys for the vehicle 20 of the customer 42, and a combination that opens the combination lock 158 of the compartment that was selected by the technician 44, step 232. At the customer's convenience, the customer 42 returns to the key exchange box 150 and selects the compartment 152 with the number 162 provided in the message from the technician 44, step 234. The customer 42 enters the combination that was provided in the message from the technician 44 into the combination lock 158, which unlocks only the selected compartment 152, step 236. The customer 42 uses the access knob 156 to open the compartment 152, enabling the customer to obtain the keys to the vehicle 20 and depart in the vehicle, step 238.

In this manner, the customer 42 may order tires 40 for the vehicle 20 and have the vehicle serviced at the modular service station 100 without waiting for a technician 44 when dropping the vehicle off for servicing, and when picking the vehicle up after it has been serviced. In addition, the use of the key exchange box 150, which includes multiple compartments 152, enables secure dropoff and pickup of keys for multiple vehicles 20 in an individualized and secure manner for servicing, without the need for a customer 42 to wait for a technician 44.

It is to be understood that the structure of the above-described modular tire service station may be altered or rearranged, or components or steps known to those skilled in the art omitted or added, without affecting the overall concept or operation of the invention. For example, the number and/or spacing arrangement of the modules 12, 14, 102 and 104 may be changed according to specific design considerations, or the configuration of the customer area 24, 138, the storage area 26, 140, and the service area 56, 144 in the modules may be adjusted, without affecting the overall concept or operation of the invention.

In addition, in the method of servicing vehicles 180, services other than tire installation may be applied without affecting the overall concept or operation of the invention. The steps of the method 180 may thus be adjusted accordingly, removing the ordering and/or purchasing of tires 40 and the delivery of the tires to the modular service center 100, while following the remaining method steps.

The invention has been described with reference to preferred embodiments. Potential modifications and alterations may occur to others upon a reading and understanding of this description. It is to be understood that all such modifications and alterations are included in the scope of the invention as set forth in the appended claims, or the equivalents thereof.

What is claimed is:

1. A method of servicing vehicles using a modular service station, the method comprising the steps of:
    providing a web site that enables a customer to select the modular service station as a location for vehicle servicing and to schedule a date for the servicing;
    enabling the customer to enter into the web site at least one of an electronic mail address and a phone number at which the customer can be contacted;
    providing a designated area for the customer to park the vehicle to be serviced on the scheduled servicing date;
    installing a key exchange box near the modular service station, the key box being formed with a plurality of secure compartments for receiving vehicle keys;
    enabling the customer to insert the keys for the vehicle to be serviced into a first selected one of the secure compartments and lock the first selected one of the secure compartments;
    unlocking and opening the compartments of the key exchange box to retrieve the vehicle keys;
    moving the vehicle to a selected area in the modular service station;
    servicing the vehicle in the modular service station;
    moving the vehicle to a designated area for pickup by the customer upon completion of the servicing;
    opening a second selected one of the secure compartments in the key exchange box and inserting the vehicle keys;
    locking the second selected one of the secure compartments in the key exchange box;
    alerting the customer that the vehicle servicing is complete, including a number corresponding to the second selected one of the secure compartments in the key exchange box and a combination for a lock that secures the second selected one of the secure compartments, thereby enabling the customer to obtain the vehicle keys.

2. The method of servicing vehicles using a modular service station of claim 1, wherein the step of opening the key exchange box is performed by opening a master lock for the key exchange box.

3. The method of servicing vehicles using a modular service station of claim 1, wherein the step of alerting the customer that the vehicle servicing is complete includes sending at least one of an electronic mail message, a phone call, and a text message to the at least one of the electronic mail address and phone number of the customer.

4. The method of servicing vehicles using a modular service station of claim 1, wherein the step of installing a key exchange box near the modular service station includes attaching the key exchange box to a structure of the modular service station.

5. The method of servicing vehicles using a modular service station of claim 1, wherein the step of installing a key exchange box near the modular service station includes attaching the key exchange box to a structure near the modular service station.

6. The method of servicing vehicles using a modular service station of claim 1, wherein the step of providing a web site includes enabling the customer to visit the web site from a location remote from the modular service station.

7. The method of servicing vehicles using a modular service station of claim 1, wherein the step of providing a web site includes enabling the customer to visit the web site from a customer area of the modular service station.

8. The method of servicing vehicles using a modular service station of claim 1, further comprising the step of enabling the customer to order tires on the web site, wherein the servicing includes installation of the ordered tires.

9. The method of servicing vehicles using a modular service station of claim 8, further comprising the step of delivering the ordered tires to the modular service station on or before the schedule installation date.

10. The method of servicing vehicles using a modular service station of claim 8, further comprising the step of storing the ordered tires in a storage area of the modular service station.

11. The method of servicing vehicles using a modular service station of claim 1, further comprising the step of providing the modular service station, wherein the modular service station includes:
a first pre-configured service module;
a second pre-configured service module proximate the first module and being spaced apart from the first module;
a customer area disposed in at least one of the first module and the second module;
a tire storage area disposed in at least one of the first module and the second module;
a tire service area disposed in at least one of the first module and the second module; and
a vehicle parking area disposed in the space between the first module and the second module.

12. The method of servicing vehicles using a modular service station of claim 11, wherein the first module and the second module are disposed in a parking lot.

13. The method of servicing vehicles using a modular service station of claim 11, wherein the first module and the second module are disposed parallel to one another.

14. The method of servicing vehicles using a modular service station of claim 11, wherein the first module and the second module are disposed in an L-shaped pattern relative to one another.

15. The method of servicing vehicles using a modular service station of claim 11, further comprising a pad including a level surface being formed in a portion of the space between the first module and the second module.

16. The method of servicing vehicles using a modular service station of claim 11, wherein the first module is spaced apart from the second module in a parallel manner, and a canopy is attached to and extends between the first module and the second module.

17. The method of servicing vehicles using a modular service station of claim 16, wherein the canopy includes an adjustable rear wall.

18. The method of servicing vehicles using a modular service station of claim 11, wherein the modules are prefabricated transportable containers.

19. The method of servicing vehicles using a modular service station of claim 11, further comprising the step of providing power generating means for at least one of the first module and the second module.

20. The method of servicing vehicles using a modular service station of claim 19, wherein the power generating means includes at least one of a generator, a battery unit, and solar panels.

* * * * *